Aug. 2, 1938.                    J. NATION                    2,125,802
                                  WHEEL
                           Filed Sept. 18, 1937

Inventor
JOHN NATION,
By Kimmel & Crowell
Attorneys.

Patented Aug. 2, 1938

2,125,802

UNITED STATES PATENT OFFICE 2,125,802

WHEEL

John Nation, Ree Heights, S. Dak.

Application September 18, 1937, Serial No. 164,559

1 Claim. (Cl. 301—70)

This invention relates to vehicle wheels, more particularly to a two-part metallic tire-structure designed primarily for that type of vehicle wheel having the hub and spokes constructed of wood, but it is to be understood that a tire-structure in accordance with this invention is for use in any connection for which it may be found applicable, and the invention has for its object to provide, in a manner as hereinafter set forth a tire-structure for increasing the strength and life of the wheel and with the tire-structure so set up relative to the spokes of the wheel whereby the possibility of it becoming loose is prevented.

A further object of the invention is to provide, in a manner as hereinafter set forth a wheel including a tire-structure capable of being expeditiously secured in position relative to the wheel spokes against protecting ferrules for the outer ends of the wheel spokes.

Further objects of the invention are to provide, in a manner as hereinafter set forth, a metallic two-part tire-structure for a wheel of the wooden hub and spoke type which is simple in its construction and arrangement, strong, durable, compact, conveniently secured and positioned relative to the spokes of the wheel, thoroughly efficient in the use extended thereby, increasing the strength of the wheel with which it forms a part of, and comparatively inexpensive to manufacture.

To the above ends essentially and to others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:—

Figure 1:
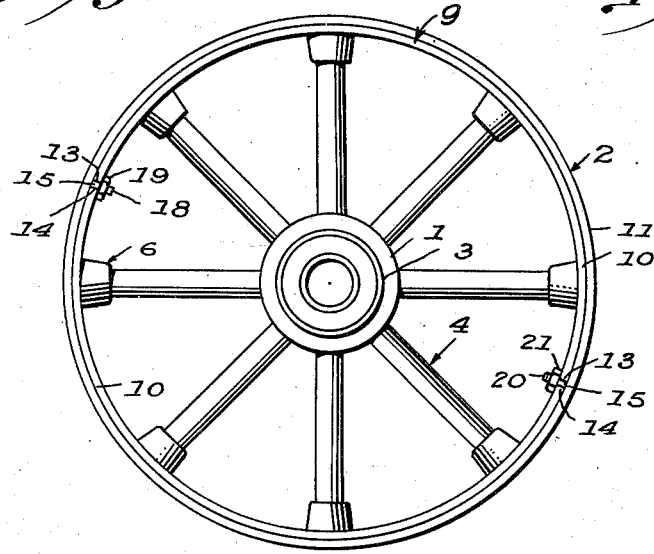
Figure 1 is a side elevation of a wheel including a two-part tire-structure in accordance with this invention.
Figure 2:
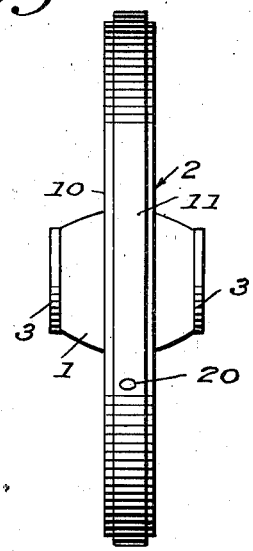
Figure 2 is an edge view of the structure shown in Figure 1.
Figure 3:
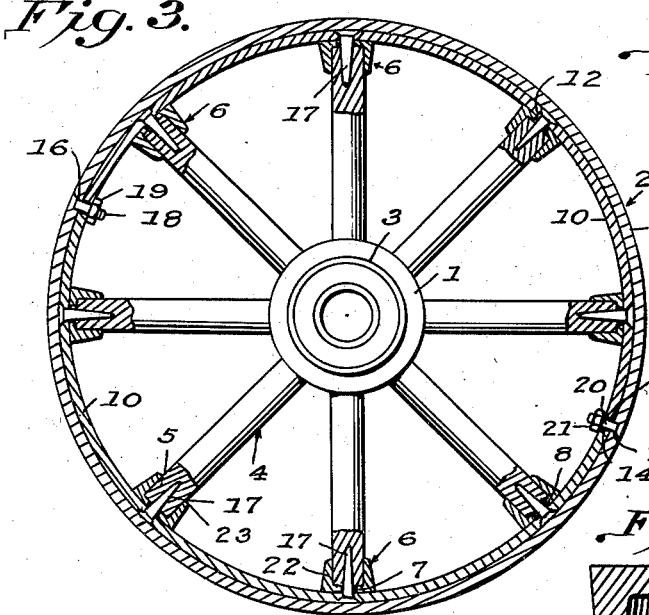
Figure 3 is a view upon an enlarged scale looking towards one side of the wheel and with the latter partly shown in elevation and in vertical section.
Figure 4:
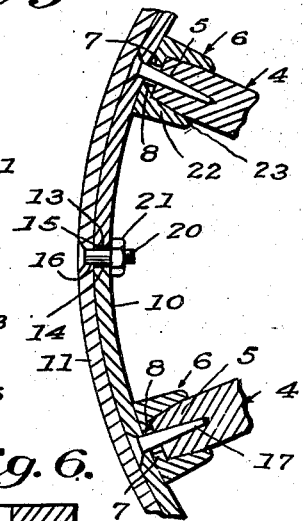
Figure 4 is a fragmentary view of the wheel in vertical section upon an enlarged scale.
Figure 6:
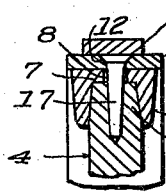
Figure 6 is a vertical sectional view of the form of protecting ferrules employed for the outer ends of the wheel spokes.

With reference to the drawing 1 indicates the wooden hub of a wheel generally designated 2. The hub 1 has peripheral reinforcing bands 3 at its end. Anchored at their inner ends in the hub 1 is a series of radially disposed wooden spokes 4 having frusto-tapered outer end terminal portions 5.

Mounted on each of said portions, as well as snugly engaging therewith is a malleable iron ferrule 6 having its closed end 7 formed with an axial opening 8.

Positioned against the ends 7 of the ferrules 6 is a tire structure 9 formed of an inner section, element, member or part 10 and an outer section, element, member or part 11 which encompasses section 10. The section 10 is in the form of a split annulus formed of a pair of endwise aligned spaced segments provided with spaced countersunk openings 12. The edges 13, 14 of each of the splits 15 in section 10 are arranged in close proximity and spaced from each other. The splits 15 are diametrically opposed with respect to section 10. The section 11 is in the form of a non-split annulus and provided with a pair of diametrically opposed countersunk openings 16, registering with the splits 15. The cross sectional length of the body of section 11 is less than the cross sectional length of the body of section 10.

The openings 12 in section 10 are spaced equi-distant from the side edges of such section. The openings 16 in section 11 are spaced equi-distant from the side edges of such section. The sections 10, 11 are formed of metallic material. The section 11 is shrunk onto the outer face of section 10 and constitutes the tread surface of the wheel.

The ferrules 6 may or may not be integral with the inner face of section 10, preferably they are not and are so shown. The section 10 has its inner face positioned against the outer face of the ends 7 of the ferrules. Preferably the ferrules 6 will be positioned equi-distant from the side edges of the section 10. The openings 12 register with the openings 8 in the ends 7 of ferrules 6. Extending through the registering openings 8, 12 and countersunk in the openings 12 are headed holdfast devices 17 which engage within the portions 5 of the spokes 4 and rigidly secure the section 10 against the outer ends of the ferrules 6. Extending through an opening 16 and a split 15 is a headed threaded bolt 18 carrying a nut 19 on its inner end. The head of bolt 18 is countersunk in opening 16. The nut 19 is for binding against the inner face of section 10 bordering one of the splits 15 and which in connection with the head of bolt 18 clamps sections 10 and 11 together. Extending through the other opening 16 and the other split 15 is a headed threaded bolt 20 carrying a nut 21 on its inner end. The head of bolt 20 is countersunk in opening 17. The nut 19 is for binding against the inner face of section 10 bordering the edges of the other split 15 and in connection with the head of bolt 21 clamps sections 10 and 11 together.

Figure 5:
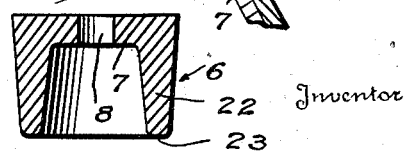
Figure 5 is a sectional detail.

The cross sectional length of each ferrule 6 is greater than the cross sectional length of the body of section 11 and in this connection attention is directed to the showing Figure 5. The inner face of the body 22 of each ferrule 6 flares from the outer end 7 of the ferrule to the inner end 23 of body 22.

What I claim is:

In a wheel of that type including wooden spokes, reinforcing ferrules at the outer ends of the spokes, a felly bearing against the outer ends of the ferrules and formed of a pair of semi-circular members, a tire shrunk upon said felly, means extending through said felly and the outer ends of the ferrules and engaging in said spokes for anchoring the felly and spokes together, and spaced means extending through the bodies of said tire and felly for clamping them together.

JOHN NATION.